(12) United States Patent
Spurling et al.

(10) Patent No.: US 11,584,213 B2
(45) Date of Patent: Feb. 21, 2023

(54) METHODS AND SYSTEMS FOR A POWERTRAIN MOUNT ASSEMBLY

(71) Applicant: Ford Global Technologies, LLC, Dearborn, MI (US)

(72) Inventors: Michael Spurling, Romford (GB); Matthew David George Shynn, Chelmsford (GB); Daniel Meckenstock, Wuppertal (DE); Marius Sawatzki, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 605 days.

(21) Appl. No.: 16/660,572

(22) Filed: Oct. 22, 2019

(65) Prior Publication Data

US 2020/0122559 A1 Apr. 23, 2020

(30) Foreign Application Priority Data

Oct. 23, 2018 (GB) ...................................... 1817252

(51) Int. Cl.
*B60K 5/12* (2006.01)
*B60K 17/00* (2006.01)

(52) U.S. Cl.
CPC ................ *B60K 5/12* (2013.01); *B60K 17/00* (2013.01)

(58) Field of Classification Search
CPC ........ B60K 5/12; B60K 17/00; B60K 5/1258; B60K 5/1275; B60K 17/06; B60K 17/30; B60Y 2306/01; B62D 21/15; B62D 21/152; B60R 21/02; E01F 9/631; E01F 9/635; E01F 9/638; E01F 9/642; E01F 9/644

USPC ........................ 248/675, 201, 659, 548, 550
See application file for complete search history.

(56) References Cited

U.S. PATENT DOCUMENTS

| | | | | |
|---|---|---|---|---|
| 1,595,526 | A * | 8/1926 | Sassaman | ................ B60K 5/12 180/291 |
| 1,834,511 | A * | 12/1931 | Andrake | ................ B64D 37/04 280/832 |
| 3,347,501 | A | 10/1967 | Van Eimeren | |
| 3,827,525 | A | 8/1974 | Felzer | |
| 4,073,357 | A | 2/1978 | Danckert | |
| 4,181,192 | A | 1/1980 | Danckert | |
| 4,836,321 | A * | 6/1989 | Baumann | ................ B62D 21/15 180/291 |
| 5,039,126 | A | 8/1991 | Prato et al. | |

(Continued)

FOREIGN PATENT DOCUMENTS

| | | |
|---|---|---|
| DE | 3710808 A1 | 10/1988 |
| DE | 19611287 A1 | 8/1996 |

(Continued)

OTHER PUBLICATIONS

Great Britain Intellectual Property Office, Combined Search and Examination Report under Sections 17 and 18(3) issued in Application No. GB1817252.8, dated Apr. 4, 2019, 6 pages.

*Primary Examiner* — Christopher Garft
*Assistant Examiner* — Michael McDuffie
(74) *Attorney, Agent, or Firm* — Vincent Mastrogiacomo; McCoy Russell LLP

(57) ABSTRACT

Methods and systems are provided for a powertrain mount assembly. The assembly comprises a tether configured to block movement of a powertrain component relative to a support frame in the event of a vehicle collision.

20 Claims, 5 Drawing Sheets

(56) References Cited

U.S. PATENT DOCUMENTS

| | | | | |
|---|---|---|---|---|
| 5,476,283 | A | * | 12/1995 | Elton ................... B60R 21/02 280/752 |
| 5,794,910 | A | * | 8/1998 | Granger ................ E01F 9/635 248/548 |
| 5,947,223 | A | * | 9/1999 | Rebmann ............... B60R 21/00 180/291 |
| 6,276,484 | B1 | * | 8/2001 | Evans .................. B60K 5/1275 180/291 |
| 8,007,033 | B2 | * | 8/2011 | Morschheuser ....... B62D 21/15 296/190.05 |
| 9,676,418 | B1 | * | 6/2017 | Mohammed ........... B62D 25/08 |
| 10,933,729 | B2 | * | 3/2021 | Shynn ................. B60K 5/1216 |
| 2006/0232051 | A1 | * | 10/2006 | Morris ................. B60R 21/2338 280/752 |
| 2015/0061306 | A1 | * | 3/2015 | Barbat ................. B62D 21/152 293/124 |
| 2015/0136919 | A1 | * | 5/2015 | Kim ..................... B60R 22/26 248/201 |
| 2015/0142271 | A1 | * | 5/2015 | Cuddihy ................ B60R 19/16 180/274 |
| 2015/0251615 | A1 | | 9/2015 | Cheng et al. |
| 2015/0251624 | A1 | * | 9/2015 | Dickinson ............. B60R 21/216 24/122.3 |
| 2019/0184804 | A1 | | 6/2019 | Shynn et al. |

FOREIGN PATENT DOCUMENTS

| | | | |
|---|---|---|---|
| DE | 19526119 | A1 | 1/1997 |
| DE | 102012005843 | A1 | 9/2013 |
| DE | 102013015116 | A1 | 3/2015 |
| EP | 1859983 | A1 | 11/2007 |
| FR | 2979079 | A1 | 2/2013 |
| FR | 3011204 A1 * | 4/2015 | ............... B60K 5/12 |
| GB | 2065038 | A | 6/1981 |
| GB | 2543325 | A | 4/2017 |
| JP | 2000301955 | A | 10/2000 |

* cited by examiner

METHODS AND SYSTEMS FOR A POWERTRAIN MOUNT ASSEMBLY

CROSS REFERENCE TO RELATED APPLICATIONS

The present application claims priority to Great Britain patent application No. 1817252.8, filed on Oct. 23, 2018. The entire contents of the above-listed application are hereby incorporated by reference for all purposes.

FIELD

The present description relates generally to powertrain mount assemblies.

BACKGROUND/SUMMARY

A powertrain for a motor vehicle is typically coupled to one or more support frame members of the vehicle by respective powertrain mounts. One or more of the powertrain mounts may be configured to fail during a collision of the motor vehicle such that the powertrain becomes decoupled from the support frame at the mount and is displaced in a desirable manner during the collision.

Other examples of addressing powertrain movement in the event of a vehicle collision include a catcher feature on an engine mount to block the mount from sliding out and inducing a degradation of the mount close to the engine. While this may resolve a stack issue of the engine mount components, it does not solve a stack up effect of an uncontrolled cylinder head. This is especially magnified in recent examples as cylinder heads are increasing in size to meet emission and fuel economy regulations.

In one example, the issues described above may be addressed by a powertrain mount assembly for a motor vehicle, comprising a first bracket configured to couple to a powertrain component of the motor vehicle, a second bracket configured to couple to a support frame member of the motor vehicle and a tether comprising a first end coupled to the first bracket and a second end of the tether couplable to the second bracket or the support frame member, and wherein the tether is configured to restrain movements of the powertrain component and the support frame member. In this way, an engine and the engine side mounts may be a lighter weight.

As one example, the tether may be loose during vehicle operation outside of a vehicle collision and may become taught only in response to a vehicle collision. The tether may be physically coupled between a body structure or a side rail at or close to a body side of an engine mount at one extreme end. At an opposite extreme end, the tether may be physically coupled to a portion of the engine at or close to an engine side of the mount. In the event of a collision, such as a front end collision, the engine may separate from the mount and move in a longitudinal direction for a distance before contacting the tether. The tether becomes taught in response to the force from the engine and transfers the force load from the engine, thereby blocking the engine from moving farther along the longitudinal direction.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
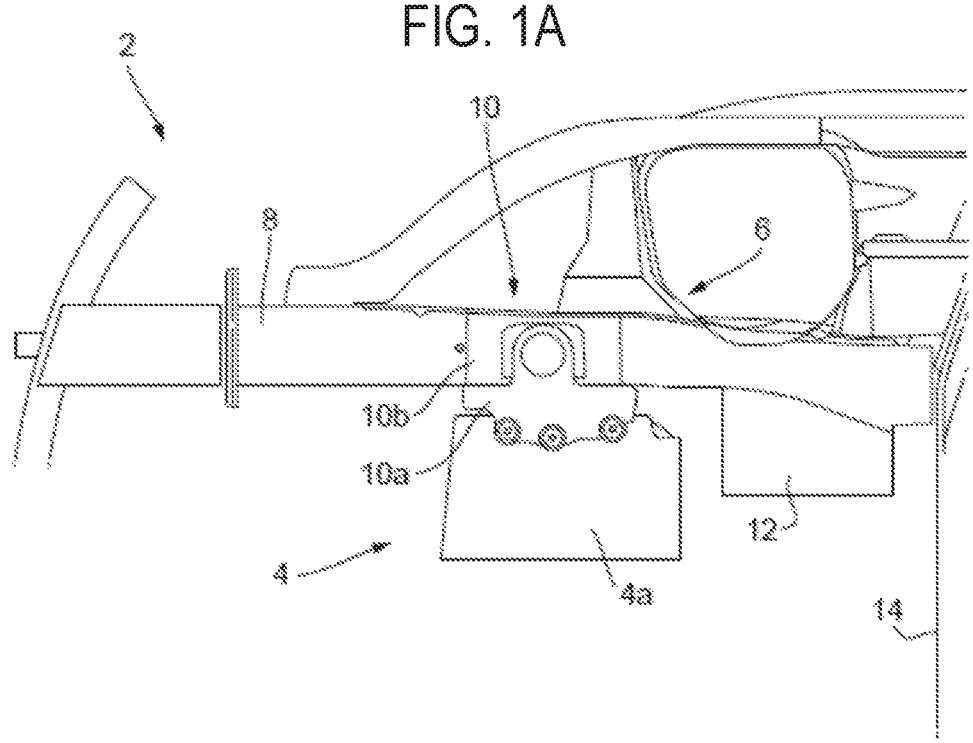
FIG. 1A is a partial schematic top view of a vehicle assembly prior to a vehicle collision.
Figure 1B:
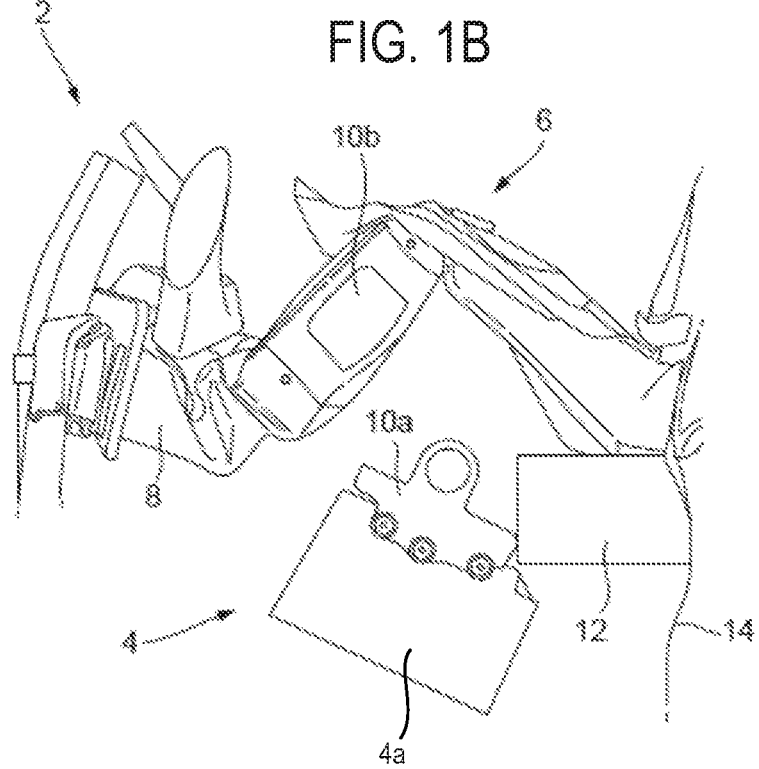
FIG. 1B is a partial schematic top view of a vehicle assembly during a vehicle collision.
Figure 2:
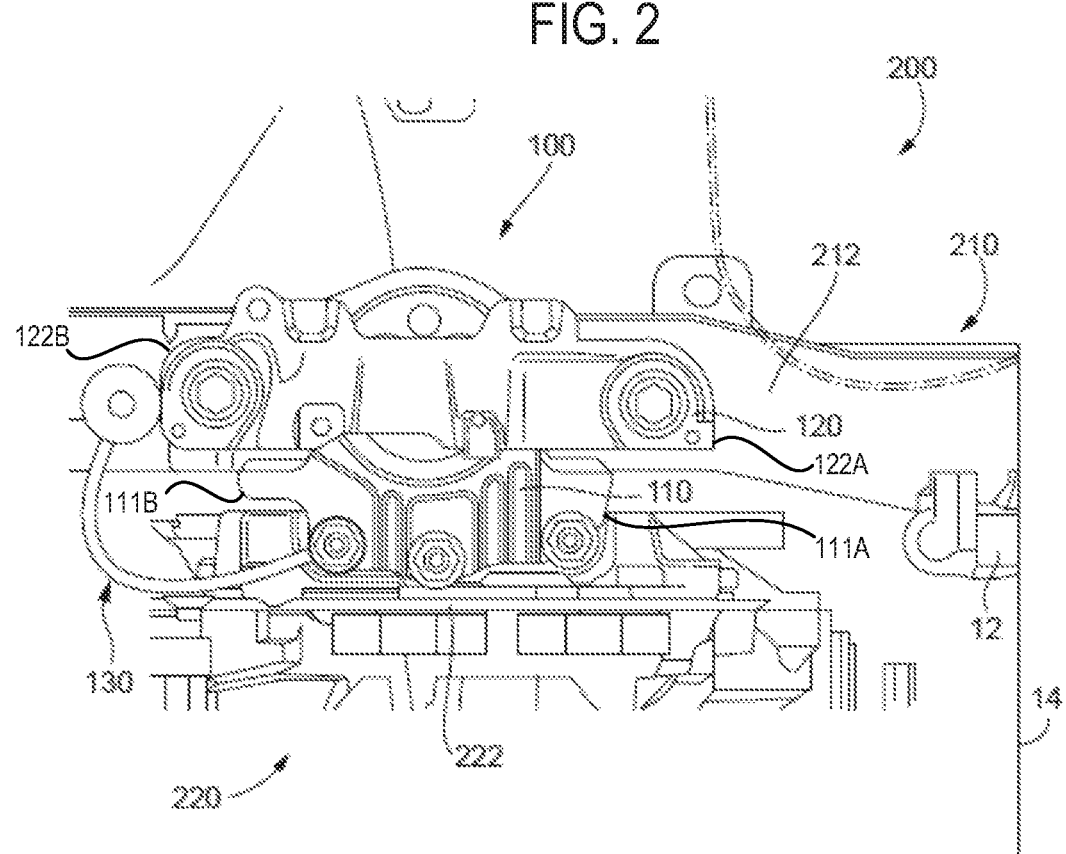
FIG. 2 is a top view of a vehicle assembly, according to an arrangement of the present disclosure, prior to a vehicle collision.
Figure 3:
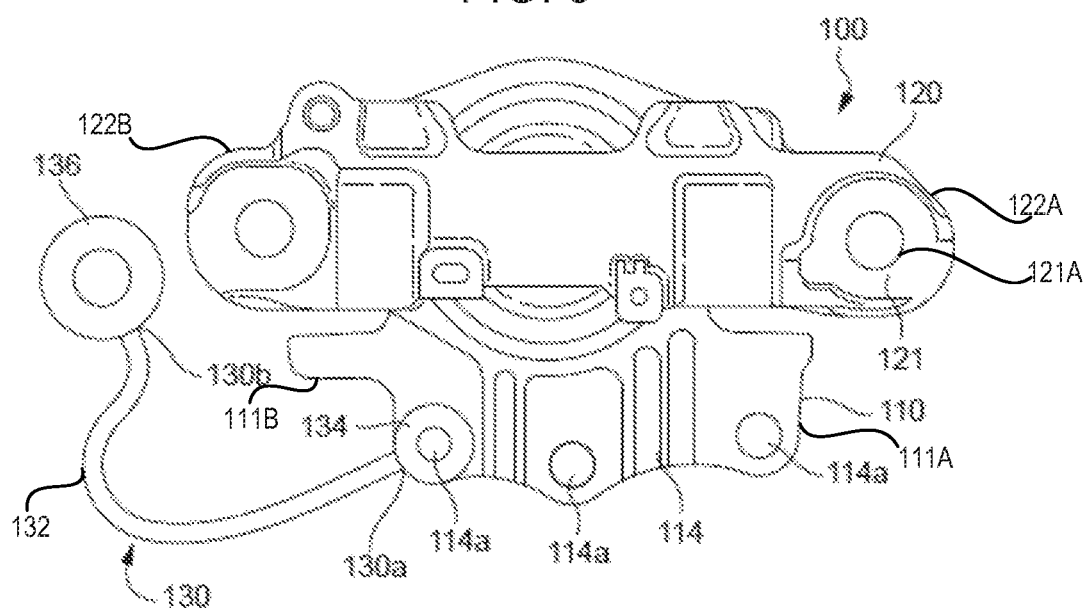
FIG. 3 is a top view of the powertrain mount assembly provided as part of the vehicle assembly shown in FIG. 2.
Figure 4:
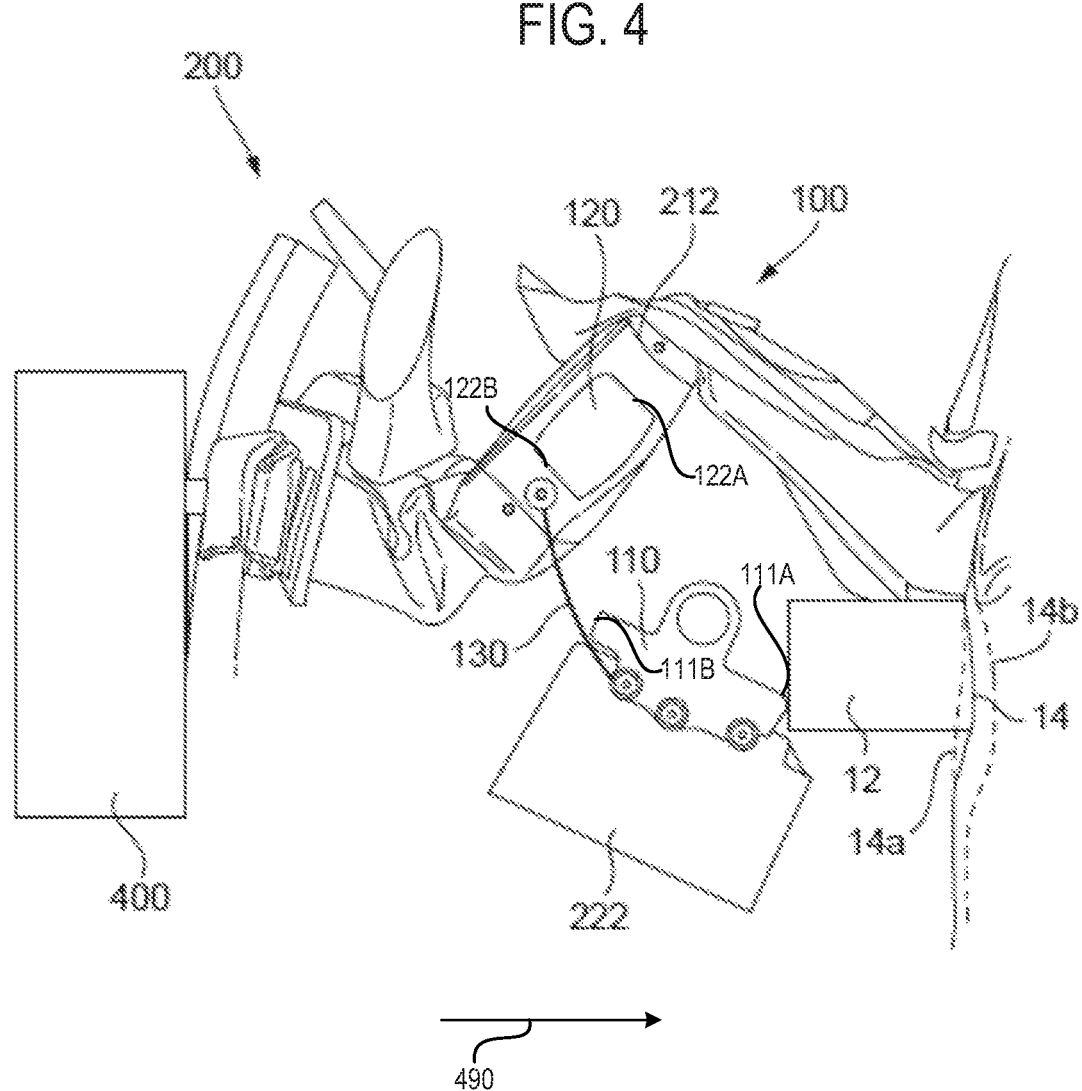
FIG. 4 is a top view of the vehicle assembly, according to arrangements of the present disclosure, during a vehicle collision.
Figure 5:
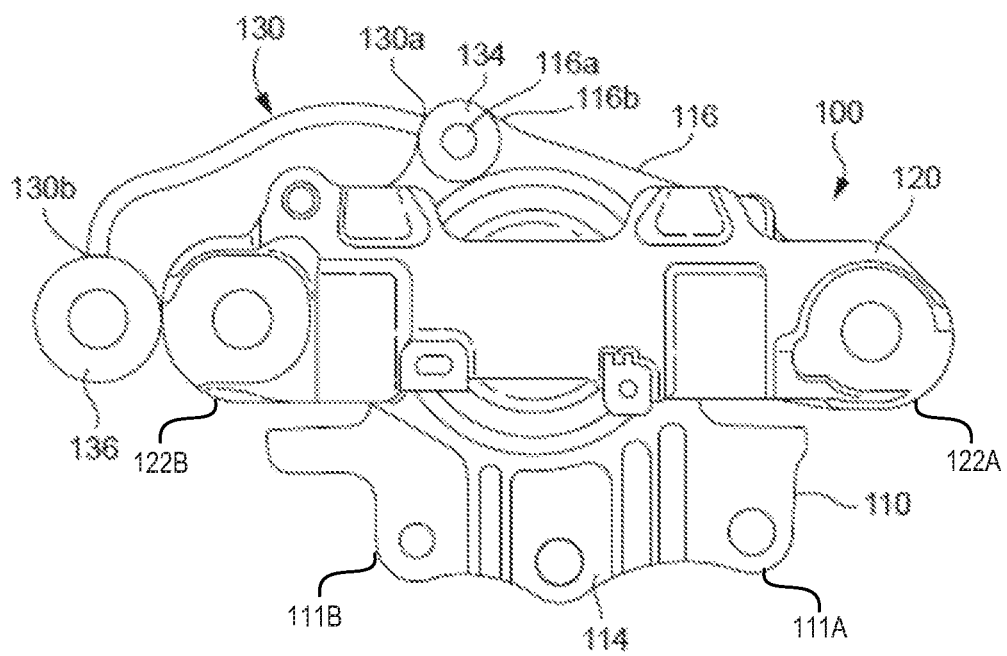
FIG. 5 is a top view of a powertrain mount assembly according to another arrangement of the present disclosure.
Figure 6:
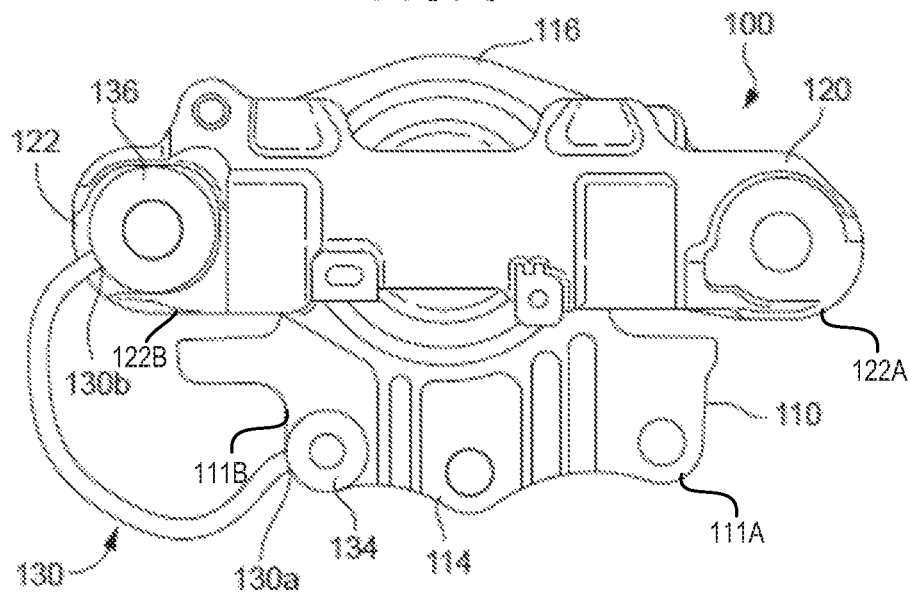
FIG. 6 is a top view of a powertrain mount assembly according to another arrangement of the present disclosure.
Figure 7:
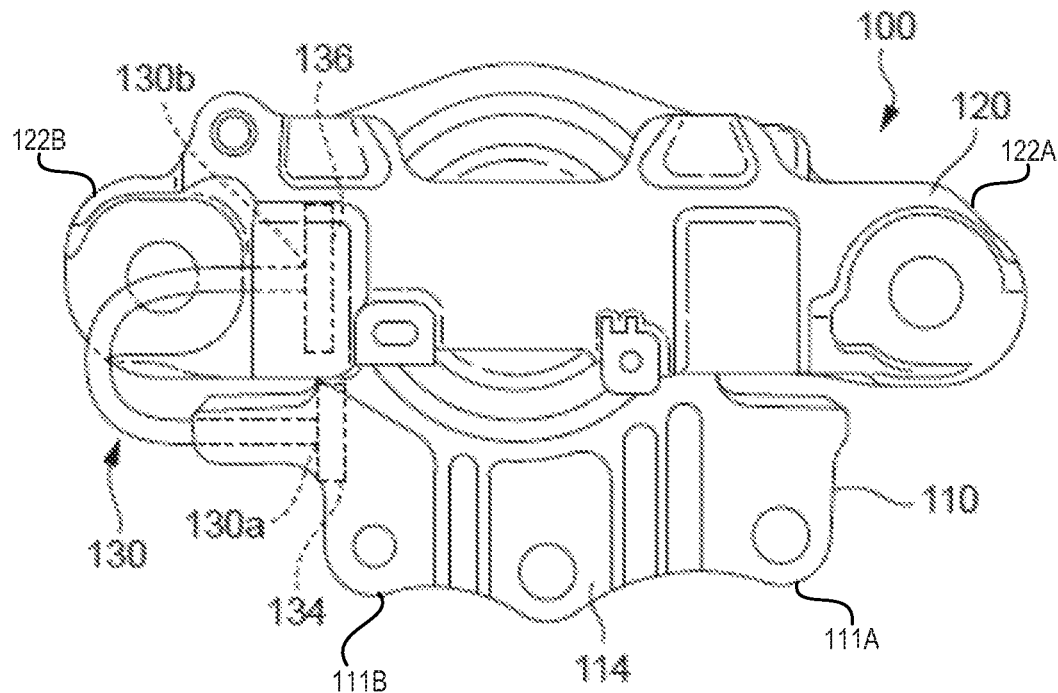
FIG. 7 is a top view of a powertrain mount assembly according to another arrangement of the present disclosure.
Figure 8:
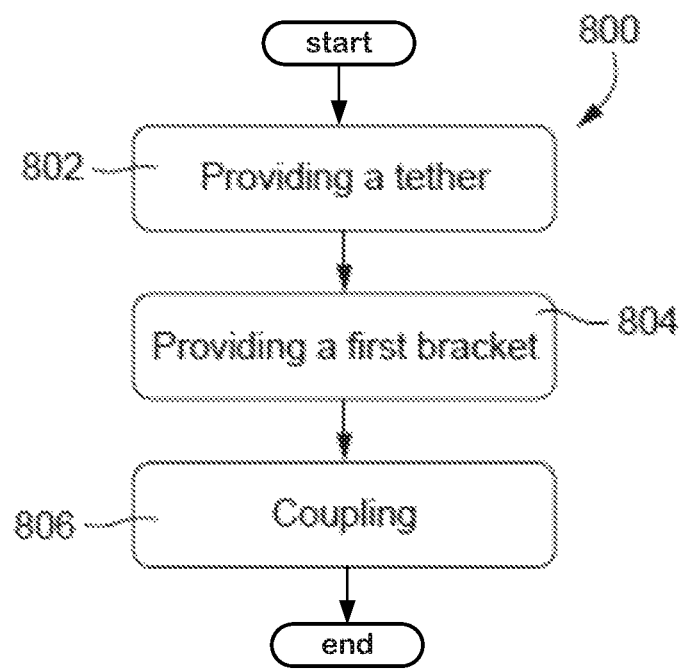
FIG. 8 is a flow chart illustrating a method manufacturing a powertrain mount assembly according to arrangements of the present disclosure.

The following description relates to systems and methods for a powertrain mount assembly. FIG. 1A is a partial schematic top view of a vehicle assembly prior to a vehicle collision. FIG. 1B is a partial schematic top view of a vehicle assembly during a vehicle collision. FIG. 2 is a top view of a vehicle assembly, according to an arrangement of the present disclosure, prior to a vehicle collision. FIG. 3 is a top view of the powertrain mount assembly provided as part of the vehicle assembly shown in FIG. 2. FIG. 4 is a top view of the vehicle assembly, according to arrangements of the present disclosure, during a vehicle collision. FIG. 5 is a top view of a powertrain mount assembly according to another arrangement of the present disclosure. FIG. 6 is a top view of a powertrain mount assembly according to another arrangement of the present disclosure. FIG. 7 is a top view of a powertrain mount assembly according to another arrangement of the present disclosure. FIG. 8 is a flow chart illustrating a method manufacturing a powertrain mount assembly according to arrangements of the present disclosure.

With reference to FIG. 1A, a motor vehicle 2 comprises a powertrain 4 and a support structure assembly 6. The support structure assembly 6 comprises a support rail 8 and a mount 10. A component 4a of the powertrain 4 is coupled to the support rail 8 by the mount 10. The mount 10 comprises a first bracket 10a coupled to the powertrain component 4a and a second bracket 10b coupled to the support rail 8. The first and second mount brackets 10a, 10b are configured such that, during normal operation of the motor vehicle 2, loads are transferred from the powertrain 4 to the support rail 8 via the engine mount 10.

The support rail 8 forms part of a crash structure of the motor vehicle 2 and, as depicted in FIG. 1B, is configured to deform and buckle during a collision of the motor vehicle in order to dissipate energy from the collision. In one example, the collision may be a front end collision. In one example, the front end collision is a right hand side front offset collision. When the support rail 8 buckles, the second bracket 10*b* of the mount 10 may be pulled away from the first bracket 10*a* before sufficient load has been applied to the first bracket 10*a* to decouple the first bracket from the powertrain component 4*a*.

In some arrangements of the motor vehicle 2, an ancillary component, such as a brake master servo 12 may be provided adjacent, or close to, to the powertrain component 4*a*. The brake master servo 12 and the powertrain component 4*a* may be configured such that the powertrain component 4*a* moves past the brake master servo 12 without colliding with the brake master servo 12 when the powertrain component 4*a* is displaced during a collision of the vehicle 2. However, as shown in FIG. 1B, if the first bracket 10*a* of the mount 10 remains coupled to the powertrain component 4*a* during the collision, the first bracket 10*a* may collide with the brake master servo 12, causing the brake master servo 12 to be deflected and contact a dash panel 14 of the vehicle, extending toward a cabin of the motor vehicle.

According to an embodiment of the present disclosure, there is provided a powertrain mount assembly for a motor vehicle, the assembly comprising a first bracket configured to couple to a powertrain component of the motor vehicle, a second bracket configured to couple to a support frame member of the motor vehicle, wherein the first and second brackets are couplable together in order to mount the powertrain component on the support frame member of the motor vehicle, and a tether, wherein a first end of the tether is coupled to the first bracket and a second end of the tether is couplable to the second bracket or the support frame member, and wherein the tether is configured to restrain relative movements of the power train component and the support frame member during a collision, e.g. by restraining relative movements of the first and second brackets.

The first bracket may comprise a bore configured to receive a fastener for coupling the first bracket to the powertrain component. The tether may be coupled to the first bracket at the bore. The first bracket may be configured to couple to the powertrain component using one or more fasteners. The tether may be configured to couple to the first bracket using one of the fasteners for coupling the first bracket to the powertrain component. For example, the tether may comprise an eyelet, e.g. at the first and of the tether, configured to receive the fastener for coupling to bracket to the powertrain component.

The first bracket may comprise a coupling portion configured to couple to the powertrain component and an opposite portion arranged on an opposite side of the second bracket to the coupling portion when the first and second brackets are coupled together. The first end of the tether may be coupled to the opposite portion of the first bracket.

The second bracket may be configured to couple to the support frame member using one or more fasteners. The second bracket may comprise a bore configured to receive a fastener for coupling the second bracket to the support frame member. The tether may be configured to couple to the second bracket at the bore. The tether may be configured to couple to the second bracket using one of the fasteners used to couple the second bracket to the support frame. For example, the tether may comprise a further eyelet, e.g. at the second end of the tether, configured to receive the fastener for coupling to second bracket to the support frame member.

The first end of the tether may be cast into the first bracket. The first end of the tether may comprise an anchor feature configured to resist removal of the tether from the first bracket. The anchor features may be configured to have a greater surface area than a corresponding length of a body of the tether. Additionally or alternatively, the anchor feature may be configured such that an area of the anchor feature projected into a plane perpendicular with a longitudinal axis of the tether body is greater than a corresponding area of the tether body. For example, the anchor feature may comprise one or more portions projecting in directions with components perpendicular to the longitudinal axis of the tether body. The first end of the tether may comprise a T-bar, eyelet, or any other suitable feature.

The second end of the tether may be cast into the second bracket. The second end of the tether may comprise an anchor feature configured to resist removal of the tether from the second bracket. For example, the second end of the tether may comprise a T-bar, eyelet, or any other feature having a greater surface area or area projected into a plane perpendicular with a longitudinal axis of the tether body than a corresponding length of the body of the tether.

A motor vehicle assembly may comprise a support frame member and the above-mentioned powertrain mount assembly, wherein the second bracket is coupled to the support frame member, and wherein the second end of the tether is coupled to the second bracket or the support frame member.

The tether may be arranged to restrict longitudinal movement of the powertrain component relative to the support frame member during the collision of the motor vehicle.

According to another aspect of the present disclosure, there is provided a method of manufacturing a powertrain mount assembly for a motor vehicle, the method comprising steps of providing a tether, providing a first bracket of the power train mount assembly, and coupling a first end of the tether to the first bracket.

Providing the first bracket of the power train mount assembly and coupling a first end of the tether to the first bracket may comprise casting the first bracket of the power train mount assembly such that a first end of the tether is cast into the first bracket.

The method may further comprise casting a second bracket of the power train mount assembly. A second end of the tether may be cast into the first bracket.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure within the scope of the claims below.

With reference to FIG. 2, a motor vehicle assembly 200, according to arrangements of the present disclosure, comprises a support structure assembly 210 and a powertrain 220. The support structure assembly 210 comprises a support frame member, such as a support rail 212 and a powertrain mount assembly 100.

With reference to FIGS. 2 and 3, the powertrain mount 100, according to arrangements of the present disclosure, comprises a first bracket 110 and a second bracket 120. The first bracket 110 is configured to couple to a component 222 of the motor vehicle powertrain 220, such as an engine or transmission of the motor vehicle. The second bracket 120 is configured to couple to the support rail 212.

The first and second brackets 110, 120 are configured to couple to one another in order to transfer load from the powertrain component 222 to the support rail 212 during operation of the motor vehicle 200.

The first bracket 110 comprises a coupling portion 114. The first bracket 110 is configured to be coupled to the powertrain component 222 at the coupling portion 114. In the arrangement shown, the coupling portion 114 comprises one or more fastener openings 114a configured to receive fasteners for coupling the first bracket 110 to the powertrain component 222. In this way, the first bracket 110 may be fixedly coupled to the powertrain component 222. As illustrated, the first bracket 110 comprises fastener openings 114a at its extreme ends, including a first extreme end 111A and a second extreme end 111B opposite the first extreme end 111A.

The powertrain component 222 may comprise corresponding bores configure to receive the fasteners. The bores may be threaded and the fasteners may be threaded into the bores after passing through the fastener openings 114a. Alternatively, the fastener openings 114a may be threaded and the fasteners may pass through the bores of the powertrain component 222 before being threaded into the fastener openings 114a. Alternatively, neither the fastener openings 114a nor the bores may be threaded, and separate threaded nuts may be provided.

The second bracket 120 may comprise a coupling portion 121, which may be configured in a similar way to the coupling portion 114 of the first bracket 110 described above. The second bracket 120 may be configured to be coupled to a support frame member, e.g. to the support rail 212, at the coupling portion 121. For example, the coupling portion 121 may comprise one or more fastener openings 121a configured to receive fasteners for coupling the second bracket 120 to the support rail 212. As illustrated, the second bracket 120 may comprise fastener openings at a first extreme end 122A and a second extreme end 122b opposite the first extreme end 122A.

The second bracket 120 and the support frame member may be configured to be coupled together in any of the ways described above in relation to the first bracket 110 and the powertrain component 222 and the features of the first bracket 110 and the powertrain component 222 described above may apply equally to the second bracket 120 and the support frame member, e.g. the support rail 212. It will be appreciated that, in a particular arrangement of the disclosure, the first bracket 110 may be coupled to the powertrain component 222 in a different way to the way in which the second bracket 120 is coupled to the support frame member. As such, one or more fasteners may be used to fixedly couple the second bracket 120 to the support rail 212.

The powertrain mount assembly 100 further comprises a tether 130 having a first end 130a and a second end 130b. As depicted in FIG. 2, the tether is coupled to the first bracket 110 at the first end 130a and is coupled to the support rail 212 at the second end 130b.

The tether 130 comprises a tether body 132 and first and second anchor features 134, 136 formed at first and second ends 130a, 130b of the tether respectively. The tether 130 is coupled to the first bracket 110 and the support rail 212 by the first and second anchor features 134, 136 respectively. As depicted, the first and second anchor features 134, 136 comprise eyelets configured to receive fasteners for coupling the tether to the first bracket and support rail 212. However, in other arrangements, the first and second anchor features 134, 136 may comprise any other features for facilitating connection of the ends of the tether 130a, 130b to components of the support structure assembly 210.

The tether body 132 comprises a resilient elongate body extending between the first and second anchor features of the tether 130. For example, the tether body 132 may comprise a braided metal cable. The tether body 132 is sufficiently flexible to enable to tether body 132 to be bent along its length to allow the first and second ends of the tether to be coupled to desirable locations, e.g. as depicted in the example of FIG. 3. However, the tether 130 may be sufficiently resilient such that a length of the tether 130 remains substantially unchanged when the tether 130 is put in tension during a collision, as described below. That is to say, the tether 130 may not break, rip, snap, tear, or perform other forms of degradation such that the tether 130 becomes more than one piece. In this way, the tether 130 remains intact during the collision.

The anchor features 134, 136 may be coupled, e.g. affixed, to ends of the tether body 132 using any desirable method. For example, the anchor features 134, 136 may be welded, brazed or adhered to the tether body and/or coupled using one or more fasteners, such as bolts and/or rivets. In one arrangement, the anchor features comprise eyelets that are welded to ends of a braided metal cable forming the tether body 132.

Alternatively, the anchor features 134, 136 may be integrally formed with the tether body 132. For example, the anchor features may be formed by the ends of a cable forming the tether body 132.

In the arrangement shown in FIG. 2, the tether 130 is coupled to the first bracket 110 and the support rail 212 at the first and second ends 130a, 130b, respectively, by fasteners that are passed through eyelets formed by the first and second anchor features 134, 136. As illustrated, the first end 130a of the tether 130 is physically coupled to a second extreme end 111B of the first bracket 110. The second end 130b is physically coupled to a portion of the side rail 212 adjacent to the second extreme end 122B of the second bracket 120. In this way, the tether body 132 extends around a side of the first bracket 110 near the second end 111B and extends toward the side rail 212 at a position adjacent to the second extreme end 122B of the second bracket 120.

With reference to FIG. 4, in the event of a collision, e.g. with an obstacle 400, the support rail 212 may become buckled in order to dissipate energy from the collision, and the first and second brackets 110, 120 of the powertrain mount assembly may become decoupled, due to the buckling of the support rail 212. This may occur before sufficient load has been applied to the first bracket 110 to decouple the bracket from the powertrain component 222 and before the first and second brackets 110, 120 become decoupled.

As depicted, the power train component 222 is also displaced due to the collision with the obstacle 400. The power train component 222 and/or the first bracket 110 may collide with the brake master servo 12 during the collision, causing the brake master server 12 to deflect the dash panel 14 and extend toward an interior cabin. In other arrangements, the power train component 222 and/or the first bracket 110 may themselves collide with the dash panel 14 and extend toward the interior cabin. In FIG. 4, the line 14a illustrates the undeflected position (e.g., a starting position) of the dash panel 14.

As depicted in FIG. 4, when the power train component and the first bracket 110 are displaced during the collision, the tether 130 is pulled tight and acts to restrain the displacement of the first bracket 110 relative to the position on the support rail 212 to which the second end 130b of the tether 130 is coupled. Because the first bracket 110 remains coupled to the power train component 222, displacement of the power train component during the collision is also restrained by the tether. In one example, the length of the tether 130 does not increase and the tether 130 does not fissure such that a maximum distance between the first bracket 110 and the support rail 212.

As illustrated in FIG. 4, the second extreme end 111B of the first bracket 110 and the second extreme end 122B of the second bracket 122 face a direction of the obstacle 400, which may be contacted by a front end of the vehicle. As shown, the tether 130 extends around components arranged on a front-end side of the first and second brackets away from the dash panel 14.

In FIG. 4, the line 14b illustrates the deformed position of the dash panel in a similar collision when the tether 130 is not provided. As shown, the tether 130 has restrained the displacement of the power train component 222 such that deflection of the dash panel and extension of the brake master servo 12 toward the interior space of the vehicle has been reduced. As shown in FIG. 4, the tether 130 is arranged within the vehicle assembly such that displacements of the first bracket 110 and the powertrain component 222 are restrained in a longitudinal direction 490 of the motor vehicle assembly. In one example, the longitudinal direction extends from a front end of the vehicle to a rear end of the vehicle. As illustrated, the powertrain component 222 collides with the first bracket 110 resulting in a displacement of the first bracket 110 in the longitudinal direction 490. As the first bracket 110 is displaced, the tether 130 lengthens and eventually becomes fully taut.

Returning to FIGS. 2 and 3, the tether 130, e.g. the first end 130a of the tether, may be coupled to the first bracket 110 at the coupling portion 114. For example, the tether 130 may couple to the first bracket 110 at one or more of the fastener openings 114a of the coupling portion 114 at which the first bracket 110 is coupled to the powertrain component 222. As shown, the first anchor feature 134 comprises an eyelet configured to receive one of the fasteners used to couple the first bracket 110 to the power train component 222 and the tether 130 may be coupled to the first bracket 110 by the fastener.

When the first end of the tether 130a is coupled to the first bracket 110 at the position at which the first bracket 110 is coupled to the powertrain component 222, the first end 130a of the tether 130 may remain coupled to the powertrain component 222 in cases in which the first bracket 110 becomes decoupled from the powertrain component 222 and may continue to restrain the displacement of the powertrain component 222.

The first bracket 110 further comprises an opposite portion 116, which is arranged on an opposite side of the second bracket 120 to the coupling portion 114 when the powertrain mount assembly is assembled. With reference to FIG. 5, in another arrangement of the disclosure, the tether 130, e.g. the first end 130a of the tether, may be coupled to the opposite portion 116 of the first bracket 110.

As depicted in FIG. 5, the opposite portion 116 may comprise a bore 116a configured to receive a fastener for coupling the first end 130a of the tether to the first bracket 110. The opposite portion 116 is arranged at a portion of the first bracket 110 opposite to the coupling portion 114. In one example, the opposite portion 116 is a protrusion with a bore 116a arranged therein. A boss 116b may be formed on the opposite portion 116 and the bore 116a may be formed in the boss 116b. In this way, the tether 130 may extend at a higher height than the example of FIG. 2. Additionally or alternatively, the opposite portion 116 may be positioned in a location that is unlikely to be contacted by the powertrain component 222 of FIG. 4, which may mitigate a likelihood of degradation of the anchor feature 134 physically coupled to the first bracket 110. In this way, a longevity and reliability of the tether 130 may be increased.

With reference to FIG. 6, in another arrangement of the present disclosure, the tether 130, e.g. the second end 130b of the tether, may be coupled to the second bracket 120 at its second extreme end 122B. As depicted in FIG. 6, the second end 130b of the tether 130 may be coupled to the second bracket 120 at the coupling portion 121. For example, the second end 130b of the tether may be coupled to the second bracket 120 at one of the fastener bores for receiving a fastener to couple the second bracket 120 to the support rail 212 at the second extreme end 122B.

In the arrangement depicted in FIG. 6, the second anchor feature 136 of the tether 130 comprises an eyelet configured to receive one of the fasteners for coupling the second bracket 120 to the support rail 212 so that the tether 130, e.g. the second end 130b of the tether, is coupled to the second bracket 120 by the fastener.

In the arrangement shown in FIG. 6, the first end 130a of the tether 130 is coupled to the first bracket 110 at the coupling portion 114 of the first bracket. However, it is equally envisaged that the first end 130a of the tether 130 may be coupled to another position on the first bracket 110 in arrangements in which the second end 130b of the tether is coupled to the second bracket 120. For example, the first end 130a of the tether 130 may be coupled to the opposite portion 116 of the first bracket.

With reference to FIG. 7, in another arrangement of the present disclosure, the tether 130, e.g. the first and/or second ends 130a, 130b of the tether may be cast into the material of the first and/or second brackets 110, 120 respectively, in order to couple the first and/or second ends 130a, 130b of the tether to the brackets 110, 120.

In the arrangement shown in FIG. 7, the first end 130a of the tether is cast into the first bracket 110 and the second end 130b of the tether is cast into the second bracket 120. However, in other arrangements, one of the first and second ends 130a, 130b of the tether may be cast into one of the first and second brackets 110, 120 and the other of the first and second ends 130a, 130b may be coupled to the other of the first and second brackets 110, 120 or to the support rail 212, e.g. in same way as in the arrangements described above with reference to FIGS. 3, 5 and 6.

When one or more of the ends 130a, 130b of the tether are cast into the first and/or second brackets 110, 120, the anchor features 134, 136 provided at the cast in ends of the tether may be configured to resist removal of the tether from the first or second brackets 110, 120. For example, the cast in anchor features 134, 136 may be shaped to have an increased surface area in contact with the material of the first and/or second bracket 110, 120. In one arrangement, the cast in anchor features 134, 136 comprise an eyelet configured such that the material of the first or second bracket 110, 120 at least partially fills an opening forming the eye of the eyelet during casting of the first or second bracket 110, 120. As illustrated, a first anchor feature 134 of the tether 130 is physically coupled, via casting, to a portion of the first bracket 110 at its second extreme end 111B and the second anchor feature 136 of the tether 130 is physically coupled to a portion of the second bracket 120 adjacent to second extreme end 122B. In the example of FIG. 7, the tether 130 extends around the second extreme end 122B of the second bracket 120 as it extends toward the first end 130a proximal to the first bracket 110.

The cast in anchor features 134, 136 may be configured such that an area of the anchor feature projected into a plane perpendicular with a longitudinal axis of tether body 132 is greater than a corresponding area of the tether body. For example, the anchor features may comprise one or more portions projecting in directions with components perpendicular to the longitudinal axis of the tether body. As depicted in FIG. 7, the cast in anchor features 134, 136 may comprise T-bars.

In some arrangements, a surface texture of the anchor features 134, 136, may be configured in order to resist removal of the anchor features from the cast brackets. For example, the anchor features 134, 136 may be given a rough surface texture. The rough surface texture may include an etching, ribbing, indentations, and the like.

Alternatively, when one or more of the ends 130a, 130b of the tether are cast into the first and/or second brackets 110, 120, the anchor features 134, 136 provided at the cast in ends of the tether 130 may be may be omitted and a portion of the tether body 132 may be cast into the bracket.

With reference to FIG. 8, the powertrain mount assembly 100 may be manufactured using a method 800. The method comprises a first step 802 in which the tether 130 is provided and a second step 804 in which the first bracket 110 is provided. The method further comprises a third step 806, in which the tether 130 is coupled to the first bracket 110.

The tether 130 may be coupled to the first bracket 110 using a fastener provided for coupling the first bracket 110 to the powertrain component 222. Alternatively, the tether 130 may be cast into the first bracket 110. Accordingly, the second and third steps of the method may comprise forming the first bracket 110 using a casting process such that the tether 130 is cast into the first bracket 110.

The method 800 may comprise a further step in which the tether is coupled to a second bracket 120 of the powertrain mount assembly 100. The further step may comprise forming the second bracket 120 using a casing process such that the tether 130 is cast into the second bracket 120.

FIGS. 1A-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In one example, the embodiments of FIGS. 2A through 7 provide a powertrain mount assembly for controlling motion of a powertrain component during a vehicle collision. In one example, the powertrain component is an engine. During a vehicle collision, such as a right-hand side front offset collision, kinematic conditions of the powertrain and the siderail result in bend points forming on the rail before an engine mount of the engine experiences enough load to cause degradation. As such, an active side of the engine mount (e.g., a portion bolted to the engine) may be pulled out in a lateral direction perpendicular to the longitudinal direction from a passive side (e.g., a portion bolted to the siderail). The assembly fixed to the engine may then swing and contact a component, such as a brake servo, a master cylinder, or the like, causing the component to move further in the longitudinal direction contacting additional components, which may be undesired.

The tether, which may be loose during operating conditions outside of the vehicle collision, may be configured to become taught during the vehicle collision. The tether may be connected between an engine body structure or the siderail at or close to the body side of the mount. At an opposite end of the tether, there may be an engine fixedly coupled to the tether. Additionally or alternatively, the opposite end of the tether may be fixedly coupled to the engine side of the mount. The tether may become taught as the engine separates from the mount and moves in the longitudinal direction into the tether. The tether may receive a force load from the engine and block further movement of the engine in the longitudinal direction, thereby mitigating further degradation to the vehicle.

In this way, a flexible tether comprising a cable, chain, or other flexible, strong connecting material may be configured to block further movement of a powertrain component in response to a vehicle collision. The technical effect of using the tether to control powertrain component movements during the vehicle collision is to decrease packaging constraints while decreasing a manufacturing cost as the tether may be easily adjusted to fit current vehicle arrangements. For example, the tether strength and length may be adjusted to tune a balance between current powertrain geometries while still blocking powertrain component displacement during a collision.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A powertrain mount assembly for a motor vehicle, comprising:
    a first bracket physically coupled to a powertrain component of the motor vehicle;
    a second bracket physically coupled to a support frame member of the motor vehicle; and
    a tether comprising a first extreme end physically coupled to the first bracket and a second extreme end of the tether physically coupled to the support frame member, wherein the second extreme end is opposite the first extreme end and wherein the tether is configured to restrain movements of the powertrain component and the support frame member.

2. The powertrain mount assembly of claim 1, wherein the first bracket comprises a bore configured to receive a fastener for coupling the first bracket to the powertrain component, and wherein the tether is configured to couple to the first bracket at the bore.

3. The powertrain mount assembly of claim 1, wherein the first bracket comprises a coupling portion configured to couple to the powertrain component and an opposite portion arranged on an opposite side of the first bracket relative to the coupling portion, wherein the first end of the tether is coupled to the opposite portion of the first bracket when the first and second brackets are coupled together.

4. The powertrain mount assembly of claim 1, wherein the second bracket comprises a bore configured to receive a fastener for coupling the second bracket to the support frame member, and wherein the tether is configured to couple to the second bracket at the bore.

5. The powertrain mount assembly of claim 1, wherein the first extreme end of the tether is cast into the first bracket.

6. The powertrain mount assembly of claim 5, wherein the first extreme end of the tether comprises an anchor feature configured to resist removal of the tether from the first bracket.

7. The powertrain mount assembly of claim 1, wherein the second extreme end of the tether is cast into the second bracket.

8. The powertrain mount assembly of claim 7, wherein the second extreme end of the tether comprises an anchor feature configured to resist removal of the tether from the second bracket.

9. The powertrain mount assembly of claim 1, wherein the tether is arranged to restrict longitudinal movement of the powertrain component relative to the support frame member during a collision of the motor vehicle.

10. A system, comprising:
    a powertrain component physically coupled to a first bracket;
    a support frame physically coupled to a second bracket; and
    a tether physically coupled to the first bracket at a first extreme end and physically coupled to the second bracket at a second extreme end, wherein the tether is configured to block a longitudinal movement of the powertrain component relative to the support frame.

11. The system of claim 10, wherein the tether is flexible.

12. The system of claim 10, wherein the tether is a braided metal, and wherein the tether is a single piece.

13. The system of claim 10, wherein the longitudinal movement is parallel to a direction of travel of a vehicle in a drive gear.

14. The system of claim 10, wherein the tether is the only tether of the system.

15. The system of claim 10, wherein the tether comprises a maximum length that is fixed and does not change during a collision.

16. The system of claim 10, wherein the powertrain component and support frame are arranged upstream of a dash panel relative to a direction of travel of a vehicle in a drive gear.

17. The system of claim 10, wherein the tether is cast into the first bracket.

18. The system of claim 10, wherein the tether comprises anchor features, wherein the anchor features comprise eyelets welded into extreme ends of the tether, wherein a first eyelet is fixedly coupled to the first bracket and a second eyelet is fixedly coupled to the second bracket or the support frame.

19. A vehicle, comprising:
    a first bracket physically coupled to a powertrain component, wherein the powertrain component is an engine or a transmission;
    a second bracket physically coupled to a support rail arranged along a lateral side of the powertrain component; and
    a tether physically coupled to the first bracket and the second bracket, wherein the tether comprises a first anchor feature at a first extreme end and a second anchor feature at a second extreme end, the first and second anchor features being identical and configured to block separation of the tether from the first and second brackets.

20. The vehicle of claim 19, wherein the tether is configured to tighten in response to the powertrain component being displaced into the tether, and wherein the first and second anchor features comprise an area projected into a plane perpendicular with a longitudinal axis of the tether that is greater than a corresponding area of the tether.

* * * * *